United States Patent [19]

Nowicki

[11] Patent Number: 4,934,651
[45] Date of Patent: Jun. 19, 1990

[54] MAGNETICALLY OPERATED VALVE AND TIMER ASSEMBLY

[75] Inventor: Michael L. Nowicki, House Springs, Mo.

[73] Assignee: Dema Engineering Company, St. Louis, Mo.

[21] Appl. No.: 429,320

[22] Filed: Oct. 31, 1989

[51] Int. Cl.[5] .............................................. F16K 31/385
[52] U.S. Cl. .................................... 251/54; 251/30.04; 251/65
[58] Field of Search .................. 251/65, 54, 30.04, 55

[56] References Cited

U.S. PATENT DOCUMENTS

| | | | |
|---|---|---|---|
| 3,212,751 | 10/1965 | Hassa | 251/65 |
| 3,376,013 | 4/1968 | Mallett | 251/38 |
| 3,818,928 | 6/1974 | Carsten | 251/65 X |
| 4,424,952 | 1/1984 | Thomson et al. | 251/54 |
| 4,819,682 | 4/1989 | Van Marcke | 251/65 X |

FOREIGN PATENT DOCUMENTS 12250 of 1913 United Kingdom .................. 251/54

Primary Examiner—Arnold Rosenthal
Attorney, Agent, or Firm—Cohn, Powell & Hind

[57] ABSTRACT

This magnetically operated valve and timer assembly (30) can be used to open a feed line (14) leading to a spray head (22) within a chemical feed block (12) to dispense a chemical solution. The assembly (30) includes a valve (34) having a valve closure plunger (52) which is moved into the open position for a predetermined time under the attraction of a magnet assembly (66) mounted to the valve (34). The time period is determined by timer (36) which is connected to the magnet assembly. The timer (36) includes a cylinder (80) receiving a piston (100) in sliding relation, the piston including a head (102) a rearward shaft (104), having a knob (108), and a forward shaft (106) connected to the magnet assembly. The piston head (102) includes a tapered groove (122) for an annular cup seal (126) which moves into a position in the groove during the forward stroke to facilitate fluid flow past the seal (126) from one side of the piston to the other. The seal (126) moves into a different position in the groove (122) to preclude fluid flow past the seal during the return stroke so that fluid must flow through the head by way of restrictive passages (120) thereby retarding the return stroke. The restrictive passages (120) include a metering orifice (140) which is controlled by an adjustable needle (154). The piston chamber (92) includes an enlarged portion (96) to facilitate the timing of the return stroke.

10 Claims, 2 Drawing Sheets

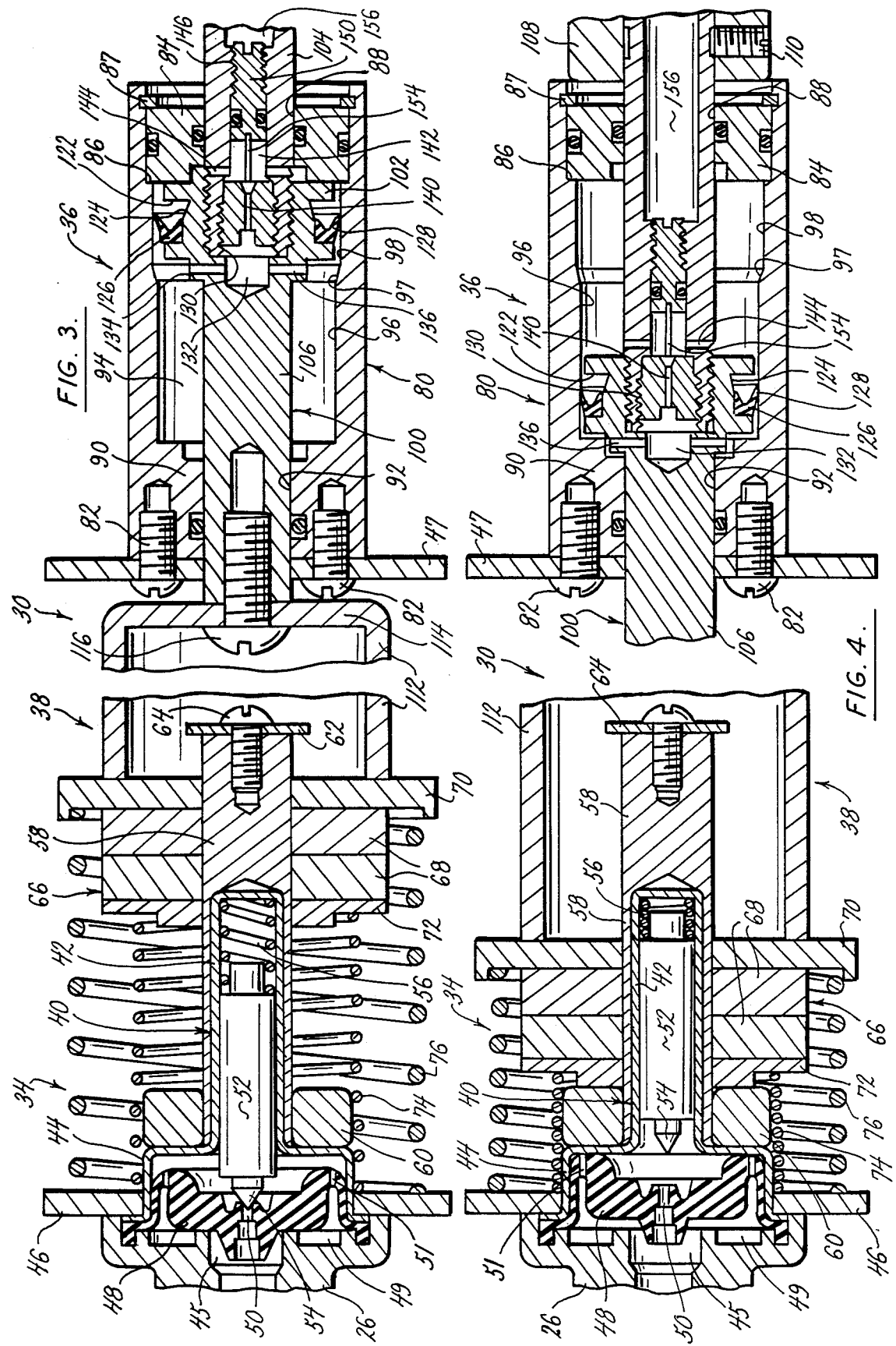

MAGNETICALLY OPERATED VALVE AND TIMER ASSEMBLY

BACKGROUND OF THE INVENTION

This invention relates generally to timer valves and particularly to a hydraulically operated adjustable timer used with a magnetically operated valve for controlling water flow to a chemical block to dissolve and dispense a predetermined amount of chemical.

Electrical and mechanical clockwork timers are well known. The former suffer from the disadvantage of requiring an electrical power supply, the latter from the disadvantage of having to be wound up. Neither type is therefore ideally suited for use with a water supply which is derived from a faucet. Valves are also known to control the closing rate of the valve following delivery of a predetermined quantity of liquid. For example, U.S. Pat. No. 3,376,013, which utilizes a dashpot.

Magnetically operated valves are also well-known which rely on permanent magnets to move a valve element. For example, U.S. Pat. No. 3,212,751 discloses the use of a permanent magnet to pull open a valve, which is then closed by spring action.

The present invention provides a valve which has distinct advantages over known timer and magnetic valves.

SUMMARY OF THE INVENTION

This hydraulically operated timer and magnetic valve assembly requires no power to operate and can be adjusted to provide a valve opening for a selected predetermined period of time.

It is an aspect of this invention to provide a magnetically operated valve and timer assembly for controlling flow through a supply line comprising support means; valve means mounted to the support means and including a valve body operatively carried by the support means and having opposed end portions, one of said end portions defining a port, plunger means slidably mounted in the valve body and having opposed ends one of said ends defining a closure for the valve port, said plunger means including means biasing said plunger means into a closed position, magnet means movably mounted on the valve body, said magnet means tending to induce movement into the plunger said magnet means including means biasing said magnet means away from the closed position; timer means mounted to the support means and including cylinder means including a first open end and an oppositely disposed second open end and a fluid-containing piston chamber disposed between said ends, piston means including a piston head slidably mounted in said piston chamber and first and second shaft portions attached to opposite sides of said piston head, said first shaft portion extending outwardly of said first opening and said second shaft portion extending outwardly of said second opening and said first shaft portion being depressible to move said piston head and said second shaft portion, and metering means for controlling fluid flow from one side of said piston head to the other side thereof, and connecting means for connecting the second piston shaft means to the magnet means for movement of said piston means with said magnet means.

It is another aspect of this invention to provide that the valve means includes guide means disposed about the valve body and receiving the magnet means in guided relation, and retaining means for the magnet means.

It is still another aspect of this invention to provide that the magnet means includes at least one magnet member mounted on the guide means and said magnet biasing means includes at least one retainer on one side of the magnet member and spring means operatively extending between the retainer and the support means.

It is yet another aspect of this invention to provide that the metering means includes first and second passage means in the piston means on opposite sides of the piston head and connecting passage means interconnecting said first and second passage means and extending through the piston head and means controlling flow through said connecting passage means.

An aspect of this invention is to provide that the flow controlling means includes a threadedly adjustable needle means extending into the connecting passage means.

Another aspect of this invention is to provide that the metering means includes a first transverse passage means through the first piston shaft portion, a second transverse passage through the second piston shaft portion and an axial passage through said piston head interconnecting said transverse passage means and an adjustable needle means threadedly mounted and axially disposed within said first shaft.

Still another aspect of this invention is to provide that said first shaft portion includes an access passage and a removable knob at the end of said shaft portion closing said passage and said adjustable needle means is threadedly mounted in said access passage.

Yet another aspect of this invention is to provide that said piston head includes an annular groove and an annular seal received in said groove and adapted to permit fluid flow past said seal when said piston means moves in one direction and substantially preclude flow past said seal when said piston moves in the other direction.

It is an aspect of this invention to provide that said piston head annular groove is tapered, and said seal is movable in said groove.

It is yet another aspect of this invention to provide that said annular seal includes a flexible portion extending radially outwardly of said groove, and said piston chamber includes an enlarged portion to permit relatively free movement of the sealed piston in said enlarged portion.

It is an aspect of this invention to provide a magnetic valve and timer assembly that is inexpensive to manufacture, very simple to operate and extremely efficient in operation.

BRIEF DESCRIPTION OF THE DRAWINGS

FIG. 3 is an enlarged cross-sectional view taken on line 3—3 of FIG. 2 showing the valve in the closed position;

FIG. 4 is a similar view to FIG. 3 but with the timer in the depressed condition.

DESCRIPTION OF THE PREFERRED EMBODIMENT

Figure 1:
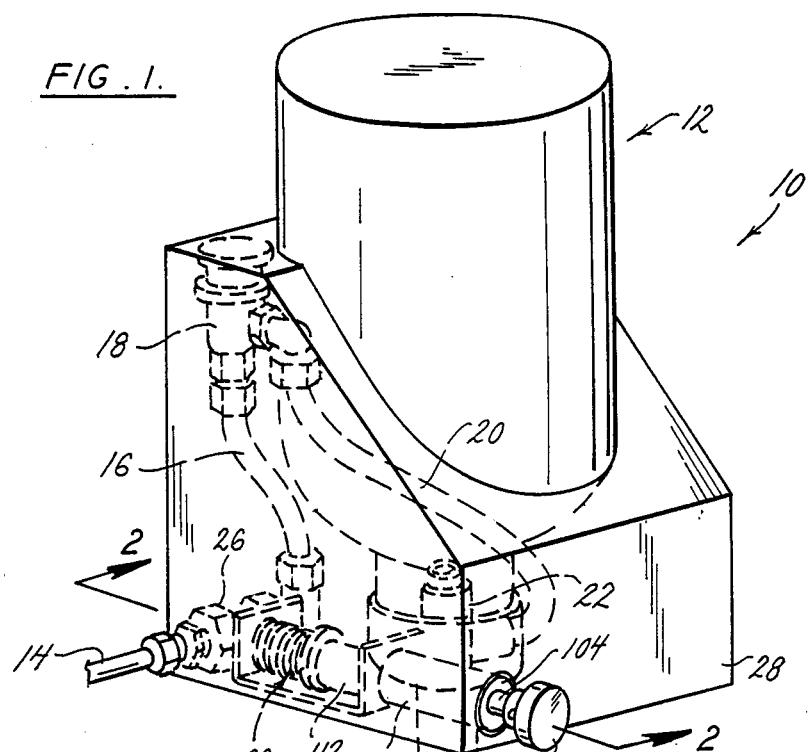
FIG. 1 is a perspective view of a chemical solution dispensing system utilizing the invention.
Figure 2:
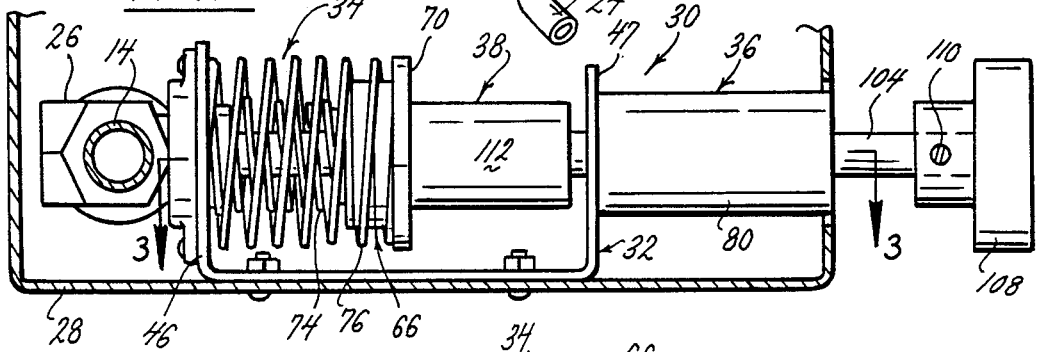
FIG. 2 is an elevational view of the valve and timer assembly taken on line 2—2 of FIG. 1.
Figure 5:
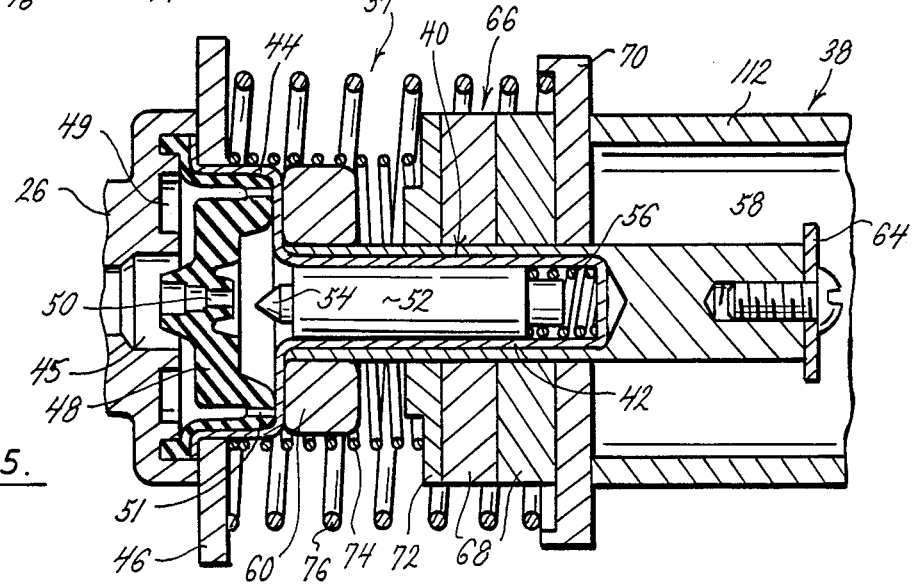
FIG. 5 is a fragmentary cross-sectional view showing the valve in the open position.

Referring now by reference numerals to the drawings and first to FIGS. 1 and 2 it will be understood that the combination magnetic valve and timer assembly 30, in the embodiment shown, is used in a chemical solution dispensing system 10 which includes a chemical feeder block assembly 12 supplied from a water source such as a faucet (not shown) through a line 14 controlled by the valve 30, a line 16 leading to a syphon 18, a line 20 supplying water to a spray head 22 disposed within the feeder block assembly 12 and a discharge line 24 dispensing the chemical solution. The valve and timer assembly 30 controls fluid flow through the supply line 14 and includes a valve 34 disposed between the lines 14 and 16 located within the housing 28 of the feed block assembly 12. The combination valve and timer assembly includes a U-shaped bracket 32, attached as by fasteners to the housing 28 and constituting a support means, the valve 34 which is a magnetically operated valve, a timer 36 and a connecting means generally indicated by numeral 38 which connects the valve 34 and timer 36 together. The valve and timer assembly 30 will now be described with greater particularity with reference to FIGS. 3-5.

As shown in FIG. 3 the valve 34 includes a valve body 40 having a cylindrical enclosure portion 42 and an enlarged end portion 44. In the embodiment shown end portion 44 is attached to a leg 46 of the bracket 32 and includes a diaphragm seal 48 defining a valve port 50 and bleeder holes 51. A plunger 52 having a valve closure end 54 is slidably mounted in the body portion 42 and said plunger is biased into the valve closed position by means of a compression spring 56 housed in the rear end of body portion 42. Essentially, the valve body 40 and valve elements 42, 44, 48, 50, 51, 52, 54 and 56 are the same as provided in a conventional solenoid operated pilot valve, such as Model No. 442P manufactured by Dema Engineering Company of St. Louis, Mo. As in such a solenoid operated valve when the plunger 52 moves rearwardly to open port 50, the diaphragm seal 48 moves rearwardly opening the main port 45 of the valve body 40. When this occurs, water passes from passage 49 communicating with line 14, through port 45 communicating with line 16. When the plunger 52 returns to close the port 50, the bleed holes 51 allow the diaphragm to return to its closed position. In the present valve the operation is the same but permanent magnets and a timer are used in lieu of a solenoid as will now be described.

An elongate tube 58, constituting a guide means, is carried by the valve body portion 42 having a support washer 60 at one end and a retainer washer 62 at the other end attached to the guide tube 58 as by a fastener 64. A magnet assembly 66 is mounted to said guide tube, said assembly including a pair of annular, permanent magnets 68 and annular rear and front retainer plates 70 and 72 respectively engaged by inner and outer springs 74 and 76, both of said spring engaging the bracket leg 46. As will be readily understood the magnet assembly 66, as a whole, is retained on the guide tube 58 by the retainer washer 62 and, as the magnets 68 approach the plunger 52, they exert a magnet attraction tending to move said magnetically attractable plunger away from the seal 48 to open the valve port 50.

The timer assembly 36 includes a cylinder means 80 mounted to the bracket leg 47 as by fasteners 82. The cylinder means 80, in the embodiment shown, is provided with a separately formed end cap 84, held in place between an abutment 86 and a snap ring 87 and having an opening 88, constituting a first end opening. The cylinder means 80 is also provided with a unitarily formed end 90 having an opening 92, constituting a second end opening. The cylinder means 80 defines a piston chamber 94 containing hydraulic fluid and having a first portion 96 and an enlarged, second portion 98 interconnected by a transition portion 97. The piston chamber 92 receives a piston means 100 in sliding relation, said piston means including a piston head 102, a hollow shaft 104, constituting a first shaft portion and a shaft 106 constituting a second shaft portion. The shaft 104 is threadedly connected to said piston head 102 and extends outwardly of said end opening 88, which provided with an O-ring seal. The shaft 106 is unitarily formed with said piston head 102 and extends outwardly of said end opening 92 which is provided with an O-ring seal.

The shaft 104 is provided at its remote end with a knob 108, attached as by a set screw 110. The shaft 106 is operatively connected to the valve 34 by the connecting means 38 which include a sleeve 112 having an end wall 114 attached to the end of shaft 106 by a fastener 116. The timer 36 is actuated by applying pressure to the knob 108 which causes the piston means 100 to move in the cylinder 80 carrying the magnetic assembly 66 with it against the return pressure exerted by the springs 74 and 74. As the piston head 102 moves in the piston chamber 94, fluid in said chamber is transferred from one side of said head to the other. On the forward stroke fluid flow is primarily between the periphery of the piston head 102 and the piston chamber 94. On the return stroke fluid flow is through an internal passage means generally indicated by numeral 120. The structural relationship of parts by which this fluid flow is achieved will now be described with reference to FIGS. 3 and 4.

The piston head 102 is somewhat smaller in diameter than the piston chamber first portion 96 and even smaller in diameter than the chamber second portion 98 and is provided with a groove 122 having a tapered portion 124. The groove is fitted with a generally U-shaped, flexible cup seal 126 having diverging legs 128 and tends to slide down the tapered portion of the groove 122 as the piston head moves forwardly thereby facilitating passage of fluid between the piston head 102 and the walls of the piston chamber 94. In the embodiment shown, the piston head 102 includes a threaded passage portion 130 and a reduced diameter unthreaded passage portion 132 and said head is provided with an annular shoulder 134 having opposed radial passages 136, which communicate with said passage portion 132 and with the piston chamber 94. The shaft 104 is hollow and is internally threaded at its forward end to receive a metering tip 138 having a metering orifice 140 with a converging end. An enlarged passage portion 142 is provided adjacent the metering tip 138 and the shaft 104 includes radial passages 144, which communicate with the passage portion 142 and with the piston chamber 94. A threaded passage portion 146 adjacent passage portion 142 receives a metering screw 150 in adjustable relation. The screw 150 is provided with an O-ring seal and has a fixedly attached wire needle 154 at one end, which is aligned with the metering orifice 140, said metering screw 150 thereby controlling flow through the metering orifice 140, said flow depending on the penetration of said needle 154 within the converging end of said orifice. A passage 156 provides access to the metering screw 150, when the knob 108 is removed from the shaft 104.

It is thought that the operation of this valve and timer assembly will be readily apparent from the foregoing description of parts. However, for completeness of disclosure the operation will be briefly described.

When it is desired to open the valve 34, the push knob 108 is depressed to move the piston head 102 forward from the position shown in FIG. 3 to the position shown in FIG. 4. Initially, the piston head 102 moves easily and hydraulic pressure pushes the U-shaped cup seal down the tapered portion 124 of the groove 122 thereby permitting fluid to pass easily from one side of the piston head 102 to the other, by way of the seal gap, as it moves into the reduced diameter portion of the piston chamber 94. As the piston means 100 continues in its forward stroke the magnet assembly 66, by virtue of the connection provided by sleeve 112 to the shaft 106, moves forwardly on the guide 58. As the magnet assembly approaches the plunger 52, the magnetic attraction urges said plunger rearwardly against the resistance of the spring 56. This causes the valve 34 to open and it remains open as the piston means 100 completes its stroke and commences its return stroke under the action of springs 74 and 76. The return stroke is retarded by movement of the cup seal 126 forwardly, as the piston head 102 moves rearwardly, into substantial sealing engagement with the piston passage portion 94, so that the fluid flow from one side of the piston head 102 to the other must be through the restrictive passage means 120 controlled by the metering orifice 140 and the adjustable needle 154. As the piston means 80 continues slowly on its return stroke, carrying the magnet assembly 66 with it, the magnetic attraction on the plunger 52 is exceeded by the pressure of the return spring 56 and said plunger is returned to its closed position. When the piston head seal 126 reaches the enlarged piston chamber portion 98 the seal is broken and rearward motion is relatively rapid. This point can be arranged to coincide with the magnetic release of the plunger 52 so that the piston means 100 returns quickly to the end of the stroke and holds the effective travel constant, which facilitates consistent timing which, in the embodiment shown is adjustable from 10 seconds to 6 minutes with flow rates of up to 4 gallons per minute.

Although the magnetic valve and timer assembly has been described by making detailed reference to a preferred embodiment, the details of description are not to be understood as restrictive numerous variants being possible within the scope of the claims hereunto appended.

I claim as my invention:

1. A magnetically operated valve and timer assembly for controlling flow through a supply line comprising:
   (a) support means,
   (b) valve means mounted to the support means and including:
     1. a valve body operatively carried by the support means and having opposed end portions, one of said end portions defining a port,
     2. plunger means slidably mounted in the valve body and having opposed ends one of said ends defining a closure for the valve port, said plunger means including means biasing said plunger means into a closed position,
     3. magnet means movably mounted on the valve body, said magnet means tending to induce movement into the plunger said magnet means including means biasing said magnet means away from the closed position,
   (c) timer means mounted to the support means and including:
     1. cylinder means including a first open end and an oppositely disposed second open end and a fluid-containing piston chamber disposed between said ends,
     2. piston means including a piston head slidably mounted in said piston chamber and first and second shaft portions attached to opposite sides of said piston head, said first shaft portion extending outwardly of said first opening and said second shaft portion extending outwardly of said second opening and said first shaft portion being depressible to move said piston head and said second shaft portion, and
     3. metering means for controlling fluid flow from one side of said piston head to the other side thereof, and
   (d) connecting means for connecting the second piston shaft means to the magnet means for movement of said piston means with said magnet means.

2. A valve and timer assembly as defined in claim 1, in which:
   (e) the valve means includes guide means disposed about the valve body and receiving the magnet means in guided relation, and retaining means for the magnet means.

3. A valve and timer assembly as defined in claim 2, in which:
   (f) the magnet means includes at least one magnet member mounted on the guide means and said magnet biasing means includes at least one retainer on one side of the magnet member and spring means operatively extending between the retainer and the support means.

4. A valve and timer assembly as defined in claim 1, in which:
   (e) the metering means includes first and second passage means in the piston means on opposite sides of the piston head and connecting passage means interconnecting said first and second passage means and extending through the piston head and means controlling flow through said connecting passage means.

5. A valve and timer assembly as defined in claim 4, in which:
   (f) the flow controlling means includes a threadedly adjustable needle means extending into the connecting passage means.

6. A valve and timer assembly as defined in claim 1, in which:
   (e) the metering means includes a first transverse passage means through the first piston shaft portion, a second transverse passage through the second piston shaft portion and an axial passage through said piston head interconnecting said transverse passage means and an adjustable needle means threadedly mounted and axially disposed within said first shaft.

7. A valve and timer assembly as defined in claim 6, in which:
   (f) said first shaft portion includes an access passage and a removable knob, at the end of said shaft portion closing said passage and said adjustable needle means is threadedly mounted in said access passage.

8. A valve and timer assembly as defined in claim 1, in which:
 (e) said piston head includes an annular groove and, cooperating seal adapted to permit fluid flow past said seal when said piston means moves in one direction and substantially preclude flow past said seal when said piston moves in the other direction.

9. A valve and timer assembly as defined in claim 8, in which:
 (f) said piston head annular groove is tapered and, said seal is movable in said groove.

10. A valve and timer assembly as defined in claim 9, in which:
 (g) said annular seal includes a flexible portion extending radially outwardly of said groove, and
 (h) said piston chamber includes an enlarged portion to permit relatively free movement of the sealed piston in said enlarged portion.

* * * * *